(12) United States Patent
Mann

(10) Patent No.: US 9,958,611 B2
(45) Date of Patent: May 1, 2018

(54) FIBER OPTIC WIRE SPLICE ENCLOSURE

(71) Applicant: Uraseal, Inc., Dover, NH (US)

(72) Inventor: William H. Mann, Contoocook, NH (US)

(73) Assignee: Uraseal, Inc., Dover, NH (US)

( * ) Notice: Subject to any disclaimer, the term of this patent is extended or adjusted under 35 U.S.C. 154(b) by 0 days. days.

(21) Appl. No.: 15/599,660

(22) Filed: May 19, 2017

(65) Prior Publication Data

US 2018/0074262 A1   Mar. 15, 2018

Related U.S. Application Data

(60) Provisional application No. 62/338,619, filed on May 19, 2016.

(51) Int. Cl.
*G02B 6/255* (2006.01)
*G02B 6/44* (2006.01)

(52) U.S. Cl.
CPC ........... *G02B 6/2558* (2013.01); *G02B 6/447* (2013.01); *G02B 6/4454* (2013.01)

(58) Field of Classification Search
CPC ..................... G02B 6/2558; G02B 6/4454
See application file for complete search history.

(56) References Cited

U.S. PATENT DOCUMENTS

| | | | | |
|---|---|---|---|---|
| 4,692,564 A * | 9/1987 | Campbell | ............ | G02B 6/4447 174/76 |
| 4,875,952 A * | 10/1989 | Mullin | ................. | H02G 15/003 156/48 |
| 5,434,945 A * | 7/1995 | Burek | ................. | G02B 6/4446 385/134 |
| 5,519,804 A * | 5/1996 | Burek | ................. | G02B 6/3878 385/134 |
| 5,689,605 A * | 11/1997 | Cobb | .................. | G02B 6/4454 385/135 |
| 7,343,077 B2 * | 3/2008 | Mann | .................. | G02B 6/4441 385/135 |
| 2006/0233508 A1 * | 10/2006 | Mann | .................. | G02B 6/4441 385/135 |

* cited by examiner

*Primary Examiner* — Sung Pak

(57) ABSTRACT

A system and method for securely holding a fiber optic cable splice in place and for creating a watertight splice by encapsulating two or more fiber optic cables having one or more spliced fiber optic strands in an enclosure with an encapsulant to create a permanent, watertight, fiber-optic splicing system and method.

4 Claims, 5 Drawing Sheets

FIBER OPTIC WIRE SPLICE ENCLOSURE

CROSS-REFERENCE TO RELATED APPLICATIONS

This application claims priority from U.S. Provisional Patent Application No. 62/338,619, titled "Fiber Optic Wire Splice Enclosure", which was filed on May 19, 2016 and is incorporated fully herein by reference.

TECHNICAL FIELD

This invention relates to the splicing of fiber optic cables and more particularly, to a system and method for facilitating fiber-optic cable to be spliced and the splice protected in an enclosure which is generally filled with an encapsulating material.

BACKGROUND INFORMATION

Fiber optic based communication systems are becoming more and more prevalent. Because of its ease of use and wide bandwidth, more and more companies who provide data, video communications and telephone services are installing fiber-optic networks. Once fiber-optic cable is placed along the street or in a building, the providers of the service must still install a fiber-optic cable from the main fiber distribution point to the premises of use. This is often termed the final section of an optical network or a drop cable.

Often times, the fiber-optic cable which comprises the final section of an optical network is installed in an underground conduit, direct buried underground or in an aerial installation. However, because this final section is installed in and around an inhabited premises, the fiber-optic cable can become damaged or broken because of construction, tree limbs, accident, weather damage and the like. Replacing a damaged or broken fiber-optic drop cable running from the network (i.e. street for example) to the premises can be expensive and time-consuming. In most instances, the preferred method of dealing with this situation is to splice the broken/damaged fiber-optic cable back together. In addition, there are other situations in which it is desirable to splice fiber optic cables together such as in manholes, pedestals and other situations or locations where fiber optic cable is to be spliced into other types of connections or other fiber-optic connections.

Although there are a number of techniques available for splicing together broken fiber-optic cables, such as the end-to-end fusion splice or a mechanical splice, the flat or round drop cables which are utilized by service providers between the optical network and the premises presents several unique problems. First of all, the drop cables presently being used include one or more optical fibers which must be spliced back together. In addition, the splice must be protected by being made water and weather proof so as to be able to withstand installation underground or overhead.

Presently, no economical and reasonable method exists to provide such a result for various cable types (flat and round) and various splicing techniques (fusion and mechanical).

Accordingly, the present invention provides a novel enclosure and method by which flat or round fiber-optic drop cables having, for example, one or two embedded fibers, may be spliced back together and held securely in place in a watertight, weather proof relatively rigid enclosure.

SUMMARY OF THE INVENTION

It is important to note that the present invention is not intended to be limited to a system or method which must satisfy one or more of any stated objects or features of the invention. It is also important to note that the present invention is not limited to the preferred, exemplary, or primary embodiment(s) described herein.

BRIEF DESCRIPTION OF THE DRAWINGS

These and other features and advantages of the present invention will be better understood by reading the following detailed description, taken together with the drawings wherein.

DESCRIPTION OF THE PREFERRED EMBODIMENT OF THE INVENTION

The present invention features a system and method for securely holding a fiber-optic drop cable and cable splice in position in a watertight enclosure. The present invention is particularly applicable to flat drop fiber-optic cable such as mini DP flat drop cable available from OFS Optics as well as round fiber-optic cable having a diameter of up to approximately ⅝ inch, although this is not a limitation of the present invention.

Figure 1:
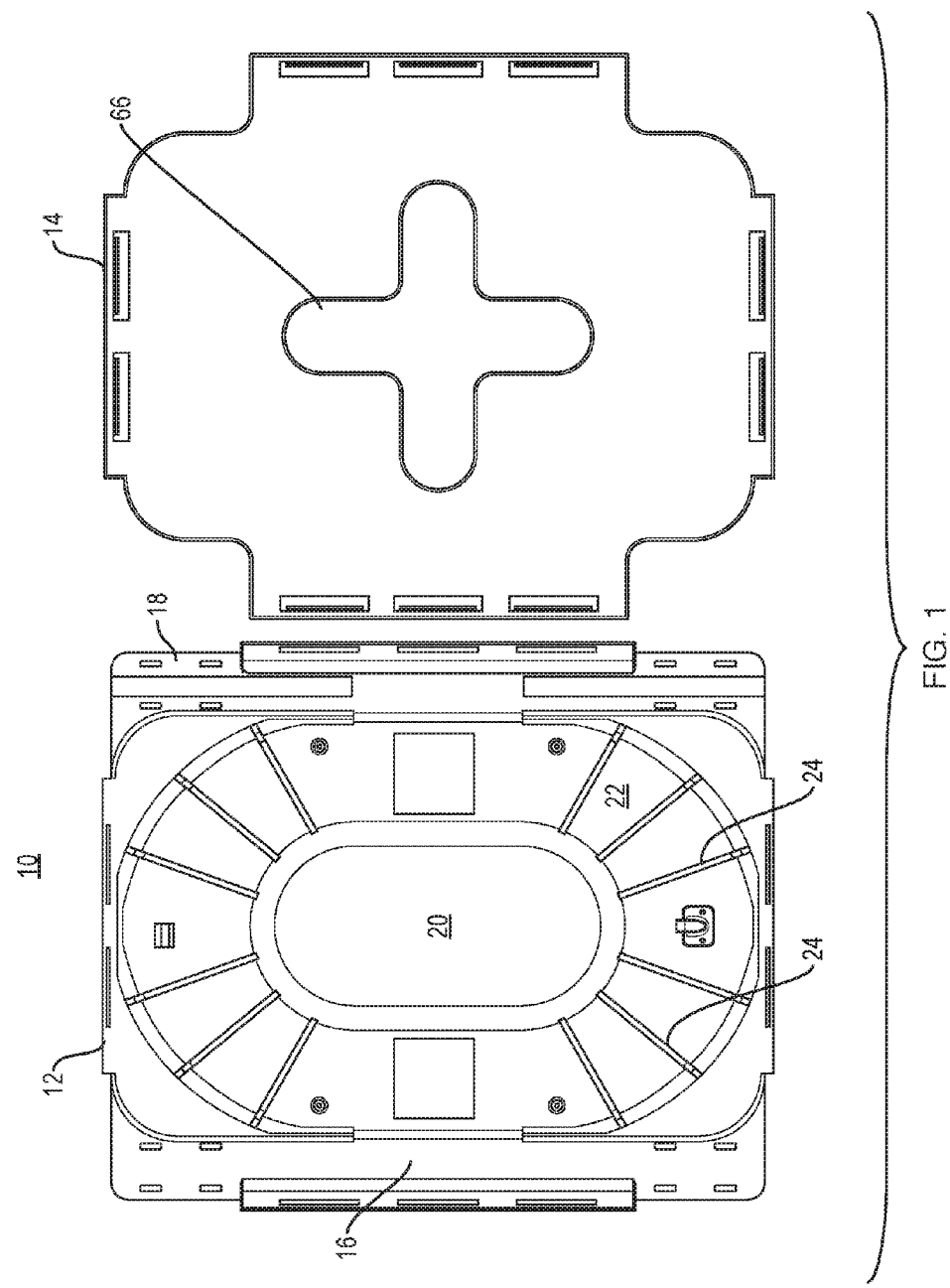
FIG. 1 is a photograph of the enclosure bottom and cover in accordance with the present invention and which is used to practice the method of the present invention.

The present invention features a two-piece plastic enclosure 10, FIG. 1, comprising a bottom portion 12 and a top portion 14. The bottom portion 12 of the enclosure includes long regions 16 and 18 proximate the edges of the bottom portion 12 which serve to hold the cables being spliced together, as will be explained in greater detail below. Proximate the central region of the bottom portion 12 of the enclosure is located a raised portion 20. The raised portion 20 is raised approximately 0.26 inches from the bottom surface 22 of the bottom portion 12 and is approximately 4 inches long and 2 inches wide. Its purpose is to displace volume in the bottom portion 12 of the enclosure requiring less encapsulant or potting material to fill the enclosure 12.

The bottom portion 12 further includes a plurality of "ribs" or raised "bars" 24 whose purpose is to keep fiber optic wires 32, 34 that are arranged on the bottom portion 12 spaced a slight distance up and away from the bottom surface 22 on the bottom portion 12 of the enclosure 12, insuring that encapsulant or other potting compound seeps under the wires fully encapsulating them and holding them in place.

First and/or second self-adhesive pads or regions 26 are provided on the bottom surface 22. Their purpose is to allow the splice 30 between two fiber optic cables 32, 34 to be at least temporarily secured to the bottom surface 22 of the enclosure until such time as the encapsulant or other potting material is inserted (poured) into the enclosure and solidifies, to permanently hold all the fiber optic wires and splices in place.

Figure 2:
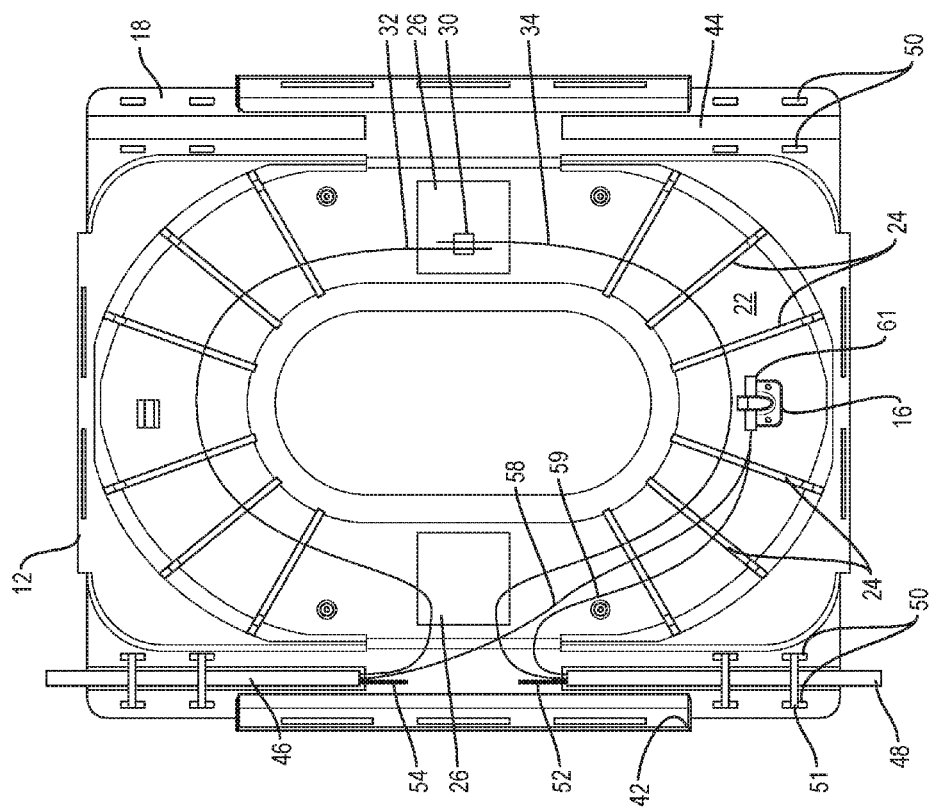
FIG. 2 is a photograph of an enclosure bottom with two fiber optic cables and spliced wires in place in accordance with one of the teachings of the present invention.

As shown in greater detail in FIG. 2, the bottom portion 12 of the enclosure 10 includes first and second longitudinally extending slots or troughs 42 and 44 into which may be placed flat or round fiber optic drop cables 46 or 48. The troughs or slots 42 and 44 include proximate their outer edge several sets of "holes" 50. Corresponding sets of holes 50 are provided so that a cable tie 52 may be inserted through a corresponding, parallel and opposite pair of holes or slots 50 and used to secure the cable 48/46 to the bottom portion 12.

In the preferred embodiment, the base 12 and cover 14 are made of a cold proof, generally rigid, crack proof PVC or other suitable similar material. The base 12 and the cover 14 are be preferably injection molded although other manufacturing techniques such as extrusions may be utilized and are within the knowledge of someone skilled in the art and considered to be within the scope of the present invention. In addition, the preferred embodiment contemplates that the troughs or channels 42, 44 may be molded or extruded with a softer or more resilient material lining at least the interior region of the trough or channel 42, 44 in order to form a better seal between the fiber-optic drop cable 46,48 in the trough or channel 42, 44. Once the cables 48/48 are in place, one or more foam seals 64, FIG. 3, maybe be put into place to prevent encapsulant from leaking out of the enclosure until it sets.

Figure 3:
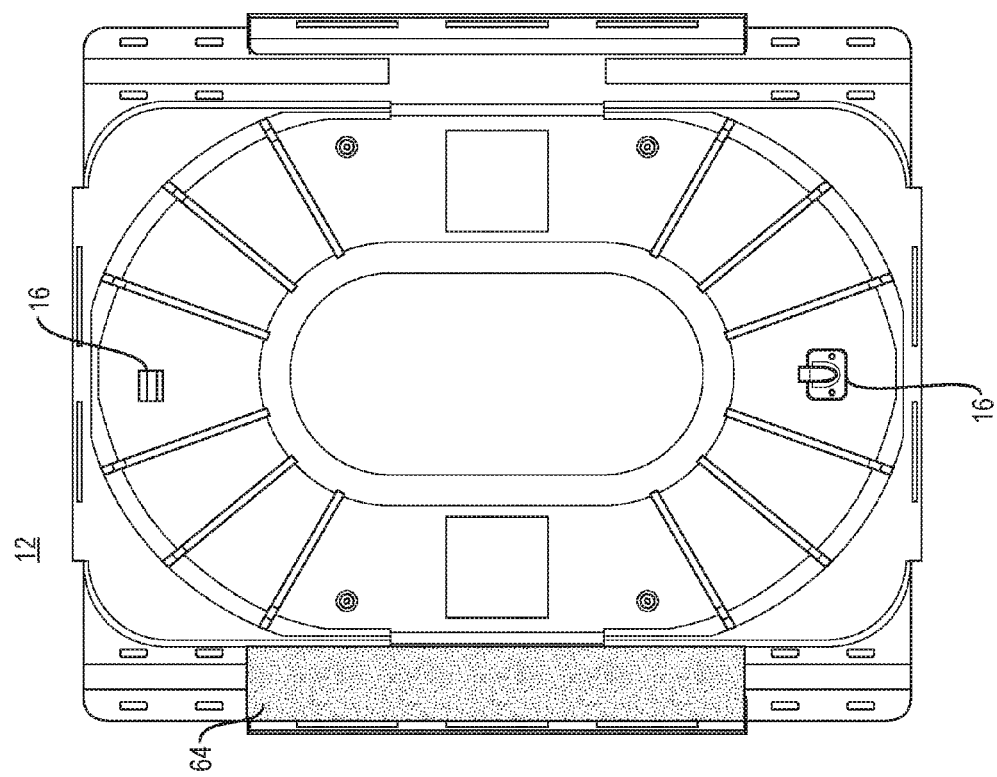
FIG. 3 is a photograph of several wire supports used in the enclosure of the present invention.
Figure 4:
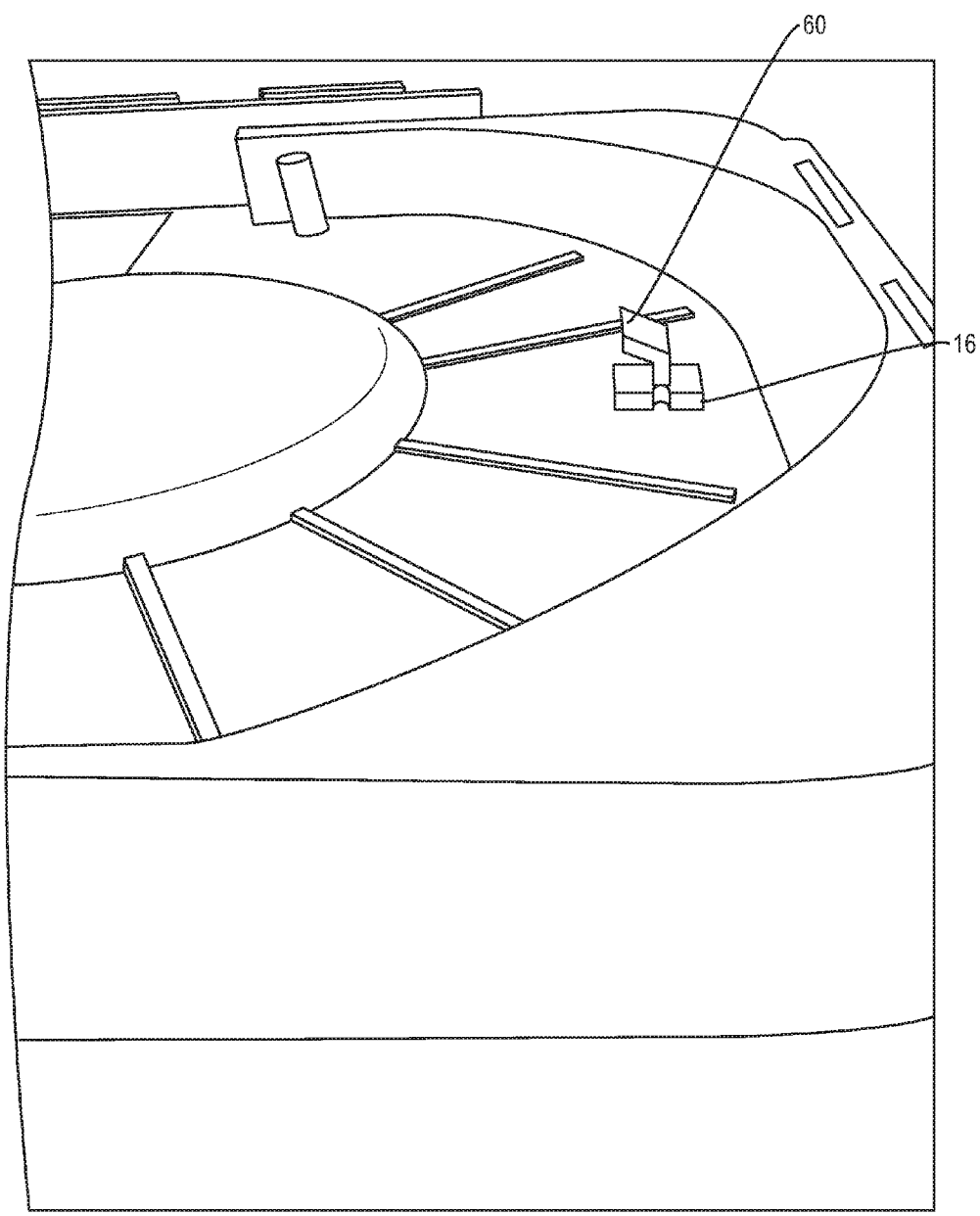
FIG. 4 is a photograph of a side view of one support in accordance with the present invention.
Figure 5:
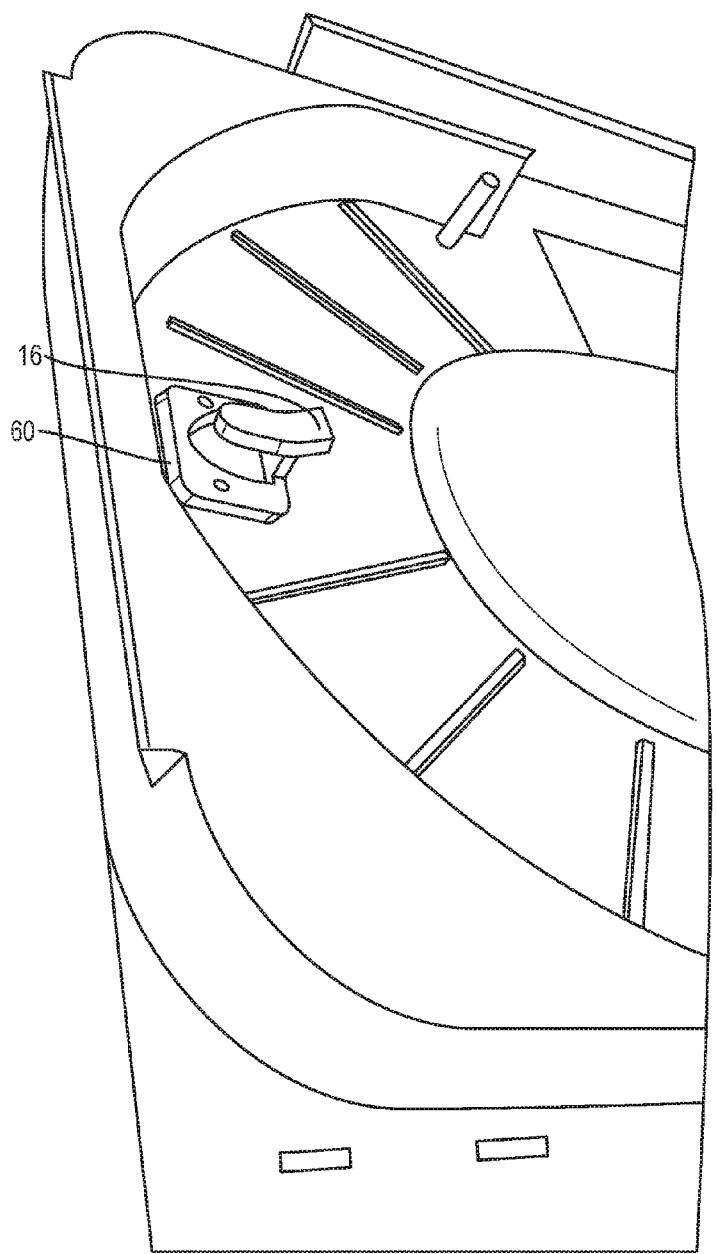
FIG. 5 is a photograph of a side view of another support in accordance with the present invention.

The bottom portion 12 also includes at least two fiber optic/tracer wire support elements 16, FIGS. 3-5. The at least two fiber optic wire support elements 16 include a base portion to which is attached an upright vertical portion extending generally vertically from the base and providing a fiber optic wire support. The support region may be oriented as shown in FIG. 4 or FIG. 5 to insure that the open region or overhang in the support region will extend towards the central region of the enclosure as shown in FIG. 4 or away from the central region as shown in FIG. 5. The fiber optic wire support elements 16 may also include a horizontal shelf or trough which can serve to hold the tracer wire(s) and prevent the tracer wire(s) from intermingling with the fiber optic wire coil.

The fiber optic wire support element 16 having an open region and overhang 60 extending outwardly as in FIG. 5 serves to hold a splice 60 between two or more tracer wires 58,59 FIG. 2. The tracer wires allow the fiber optic enclosure to be buried and later "found" for further repairs. The tracer wires 58, 59 are placed on the "exterior" side of the wire support elements 16 while the fiber optic wires are placed in or along the "interior" of the wire support elements 16 as shown in FIG. 4.

Presently, one of the most preferred methods of splicing a fiber-optic cable is known as an end-to-end fusion splice which, as is well known in the art, is formed by first sliding a clear plastic piece having a steel spine over one of the cable strands. Subsequently, the fiber optic strands to be spliced are placed end-to-end and the fiber strands are fused together using a splicing device. The clear plastic piece is then positioned over the fusion splice and heat shrunk over the fusion splice. The steel shank or spine serves to maintain the alignment of the ends of the abutted fiber optic strands. This fusion splice is then placed on the adhesive pad 26 to be held generally securely temporarily while other splices are prepared and until such time as the cover can be snapped on and encapsulant poured into the enclosure. Any other type of splice such as 3M mechanical spice may be accommodated by the present invention. The at least two fiber optic wire support elements 16 serve to then contain the multiple fiber optic strands which are coiled within the enclosure base 12 preventing the strands from springing up out of their coiled position until the cover is in place and encapsulant fills the enclosure.

The enclosure of the present invention and the method for its use is described in greater detail below. The first step in splicing together two fiber-optic cables is to strip the ends of the fiber-optic cables 46, 48 exposing one or more fibers 32, 34 being at least one fiber optic strand from each of the cables 46, 48; a strength member 52, 54 from each fiber-optic cable; and a tracer wire from each fiber optic cable 46/48.

The strength members 52, 54 provide strength to the fiber optic cables 46, 48 in the longitudinal direction preventing the cable from stretching and breaking the fiber-optic cable(s). In accordance with the present invention, approximately 1 inch or more of the strength members 52, 54 are exposed and when encapsulated in the encapsulating compound which will later fill the enclosure, help prevent the fiber-optic cables 46, 48 from moving and being pulled apart due to someone or something pulling on the cable or due to normal thermal expansion and contraction thus providing excellent "pullout strength" for the fiber-optic cables.

If provided in the fiber-optic cables 46, 48, tracer wires 58, 59 allow the cable to be located if buried underground. The tracer wires 58, 59 are wound in the exterior region of the enclosure and "clipped" together 60 to provide one continuous conductive path through the tracer wires. The tracer wires may be placed on or under horizontal shelves as shown at 60, FIG. 5, if provided, or any other location in the enclosure.

Several inches to several feet of fiber optic cable 46, 48 may be stripped prior to being fused together in a fusion or other type of splice. All of the excess fiber optic cable strands will be coiled in the interior region of the base 12 of the enclosure against the interior facing region of one or more fences or supports 16. The enclosure is sized such that the coiled fiber optic strands forms a coil of no less than 3 inches in diameter to maintain signal integrity in the fiber optic cables.

In order to facilitate coiling of the fiber optic strands the coil may first be made against one fence 16. Subsequently, one a more other fences may be added. A fiber coil diameter of no more than three inches is maintained, being careful not to exceed the three inch diameter especially in the regions between the fences 16 and the corners of the enclosure. Coils with bulges in this region will be prone to signal loss.

Once all of the splices have been made and all of the fiber optic strands coiled, the cover 14 is snapped in place over the spliced and coiled fiber optic cables. The cover 40 may be made generally flat or with an upward bow. Any open regions and unused fiber-optic cable slots in the base 70 are plugged using either short pieces of dummy fiber optic cables, in the case of unused slots, pre-cut foam pieces or other suitable material thereby preventing the encapsulating compound from running out of the enclosure until such time as the compound solidifies.

It is presently envisioned that the enclosure will typically be filled with an encapsulating compound in a horizontal position. In order to facilitate this filling, the cover 14 is provided with an "X" or "+" shaped opening that allows the encapsulant to be poured in four (4) directions directing the encapsulant into the distant reaches of the enclosure in an effort to make sure all wires are thoroughly encapsulated. An encapsulating material such as a two component urethane encapsulant having a low enough viscosity to flow into the enclosure and cure in a relatively short time of approximately 2 to 5 minutes is poured into the enclosure. The encapsulant does not expand that is, it has a low co-efficient of expansion.

The cover 14 of the enclosure is preferably made of a clear material so that the encapsulant can be seen in the enclosure and any air bubbles squeezed out. Once the encapsulant has cured, the enclosure may be placed in a vertical position if desired or buried under ground. Although the present drawings illustrate fiber-optic cables 46, 48 inserted in opposite ends of the same cable slot, this is not a limitation of the present invention as the fiber optic cables may be inserted in any one of the four (or more) provided cable positions.

It is important to note that the present invention is not intended to be limited to a system or method which must satisfy one or more of any stated objects or features of the invention. It is also important to note that the present invention is not limited to the preferred, exemplary, or primary embodiment(s) described herein. Modifications and substitutions by one of ordinary skill in the art are considered to be within the scope of the present invention, which is not to be limited except by the allowed claims and any legal equivalents thereto.

The invention claimed is:

1. A fiber optic drop cable splice kit, comprising:
   a fiber cable splice enclosure adapted to be filled with an encapsulating compound, said enclosure having a top cover portion and a bottom portion, said enclosure including a first open end region and a second open end region disposed on an opposite end of said enclosure from said first end region, said bottom portion including a first surface having a first longitudinal edge region and a second longitudinal edge region, said second longitudinal end region disposed on an opposite side of said first surface from said first longitudinal edge region;
   said first longitudinal edge region in said bottom portion including at least a first cable engagement region and said second longitudinal edge region including at least a second cable engagement region, each of said first and second cable engagement regions forming a fiber optic drop cable engagement region, said fiber optic drop cable engagement region configured for engaging with at least first and second fiber optic drop cables, each said first and second fiber optic drop cable including at least one fiber strand to be spliced, each of said first and second cable engagement regions including a cable retention device engagement region configured for engaging with a cable retention device configured for retaining a fiber optic cable in place in said first and second cable engagement regions;
   a plurality of spacer ribs disposed on said first surface of said bottom portion, and configured for supporting one or more fiber optic wire disposed in said enclosure in spaced relationship with the first surface;
   at least one self-adhesive area disposed on said first surface of said bottom portion, said at least one self-adhesive area configured for holding and supporting at least the splice region of said first and second fibers and any un-spliced region of said at least first and second fibers, for allowing said encapsulating compound to flow around and directly contact said at least first and second spliced fibers;
   at least one spliced fiber support, for holding and supporting at least the spliced first and second fibers;
   said enclosure top cover including an opening configured in the shape of one of an "X" or an "+"; and
   an encapsulating compound having an initial viscosity configured to allow said encapsulating compound to be fluidly introduced into said enclosure through said "X" or "+" shaped opening in said enclosure cover, and to flow generally throughout said enclosure to directly contact said at least first and second spliced fibers and said at least one spliced fiber support, and a final viscosity forming a generally hardened encapsulation of said at least first and second spliced fibers.

2. The fiber cable splice kit of claim 1 wherein said top portion frictionally engages with said bottom portion.

3. The fiber cable splice kit of claim 1 wherein said first and second cables include fiber optic strands.

4. The fiber cable splice kit of claim 1 further including at least first and second seals, configured for sealing at least said first open end region and a second open end region formed by said top cover portion engaged with said bottom portion.

* * * * *